T. S. STEPHENS.
POWER DRIVEN CULTIVATOR.
APPLICATION FILED JULY 8, 1920.
1,416,993.
Patented May 23, 1922.
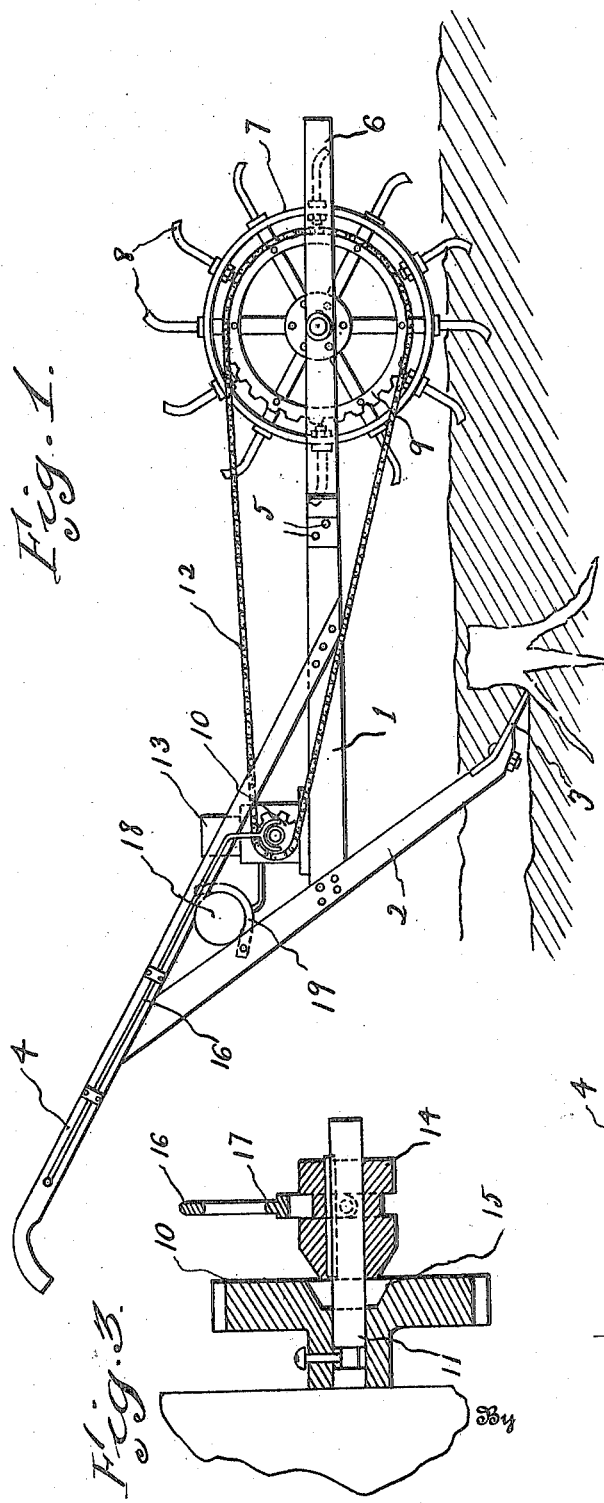
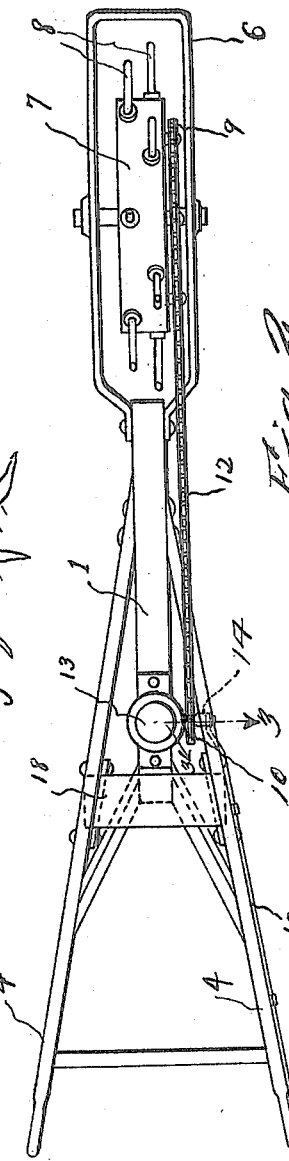
Inventor
T. S. Stephens
D. Swift
his Attorney

UNITED STATES PATENT OFFICE.

THOMAS S. STEPHENS, OF GRIFFIN, GEORGIA.

POWER-DRIVEN CULTIVATOR.

1,416,993. Specification of Letters Patent. Patented May 23, 1922.

Application filed July 8, 1920. Serial No. 394,856.

*To all whom it may concern:*

Be it known that I, THOMAS S. STEPHENS, a citizen of the United States, residing at Griffin, in the county of Spalding, State of Georgia, have invented a new and useful Power-Driven Cultivator; and I do hereby declare the following to be a full, clear, and exact description of the invention, such as will enable others skilled in the art to which it appertains to make and use the same.

The invention relates to power driven cultivators and has for its object to provide a device of this character which will be light in construction and which may be easily handled by one man.

A further object is to provide a cultivator plow provided with a plow standard, to which standard a cultivator shovel is attached, and a beam, to the forward end of which is attached a tractor wheel which is driven by an engine carried on the rear end of the plow beam, said tractor wheel forming means for pulling the plow.

A further object is to provide a clutch mechanism whereby the rotation of the tractor wheel may be controlled, said clutch mechanism being of a type, which will slip if the cultivator shovel comes in engagement with a stump or other obstruction thereby preventing the breaking of the shovel.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the power plow.

Figure 2 is a top plan view of the plow.

Figure 3 is a sectional view through the clutch device for controlling the rotation of the tractor wheel.

Referring to the drawings, the numeral 1 designates a plow beam and 2 the standard thereof, to which standard the cultivator shovel 3 is attached in any conventional way. Extending rearwardly and upwardly from the sides of the beam 1 are spaced handles 4, which handles are adapted to be grasped by the operator during a plowing operation. Secured to the forward end of the beam 1 as at 5 is a looped member 6, which looped member has rotatably mounted in bearings thereof a traction wheel 7. Traction wheel 7 is provided with a plurality of ground engaging fingers 8, which fingers are in staggered relation to each other and are adapted to engage the ground so that the cultivator plow as a whole will be moved forwardly. Secured to the spokes of the tractor wheel 7 is a sprocket wheel 9 and extending around said sprocket wheel 9 and a sprocket wheel 10 which is rotatably mounted on the engine shaft 11 is a sprocket chain 12, through the medium of which sprocket chain, power is transmitted from the engine 13 to the tractor wheel, when the male clutch member 14 is in engagement with the female clutch depression 15 in the sprocket 10. Male clutch member 14 rotates constantly with the drive shaft 11 and when it is desired to throw said male clutch member into engagement with the clutch member 15, the operating rod 16 is rocked in its bearings so that the clutch carrying arm 17 will move clutch member 14 longitudinally on the shaft 11.

Engine 13 may be secured in any suitable manner adjacent the rear end of the plow beam 1 and fuel may be fed to the same from a tank 18 carried by bracket 19. By providing a clutch of the cone type it will be seen that when the clutch is in engagement and the tractor wheel 7 is moving the plow forwardly, that if the plow shovel should come into engagement with an obstruction that the clutch members would slip thereby preventing the breaking of the plow point, said slipping of the clutch members being instantaneous, thereby preventing the breaking of the cultivator shovel.

From the above it will be seen that a power driven cultivator is provided which may be handled entirely by one man and one wherein the structure is extremely simple, thereby allowing the device to be cheaply made.

The invention having been set forth what is claimed as new and useful is:—

A tractor comprising a substantially horizontally disposed frame, said frame comprising a rearwardly extending beam, rearwardly and upwardly extending handle members carried by said beam, a rotatably mounted tractor wheel, the forward end of said beam being provided with a looped member in the same plane as the beam and having parallel sides, a tractor wheel disposed in said looped member and having bearings in the parallel sides thereof, said tractor wheel being provided with ground engaging elements in staggered relation to each other, an engine carried by the rear end of the plow beam and disposed between the handle members and provided with a drive shaft, a sprocket wheel rotatably mounted on the engine drive shaft, a sprocket carried by one side of tractor wheel and disposed within the looped member, a chain extending around said sprockets, a depression in one side of the sprocket carried by the engine drive shaft, a slidable clutch member feathered on the engine drive shaft, means whereby said clutch member may be moved into and out of engagement with the depression in the sprocket; said slidable clutch member allowing running of the engine by slipping of the clutch members.

In testimony whereof I have signed my name to this specification in the presence of the subscribing witnesses.

THOMAS S. STEPHENS.

Witnesses:
R. S. ISON,
A. J. DILLON,
JOHN F. HILL.